May 21, 1929.   A. F. MELCHING   1,713,771
CONTROL APPARATUS
Filed April 30, 1927
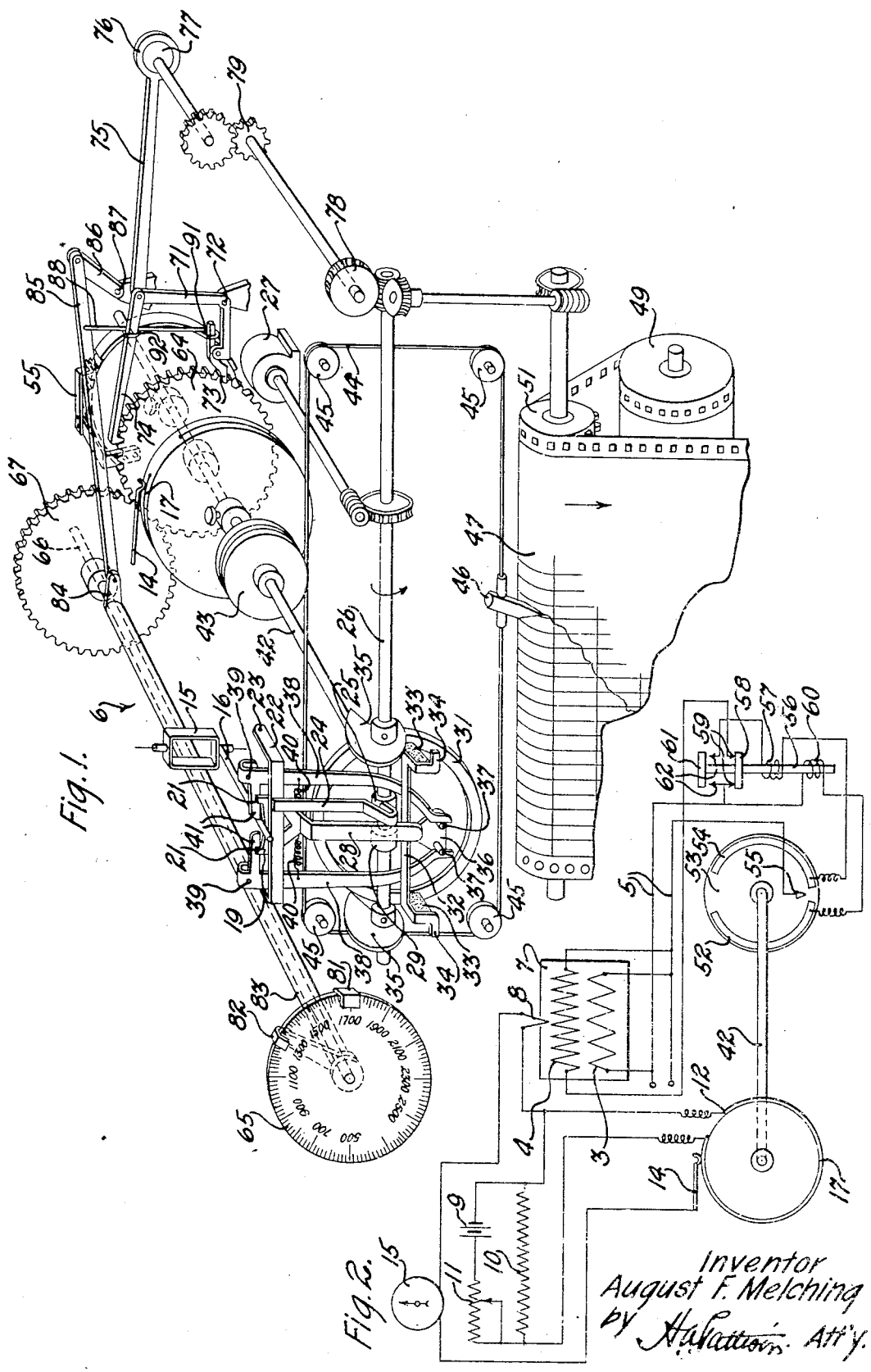
Inventor
August F. Melching Patented May 21, 1929.

1,713,771

UNITED STATES PATENT OFFICE.

AUGUST FRED MELCHING, OF FOREST PARK, ILLINOIS, ASSIGNOR TO WESTERN ELECTRIC COMPANY, INCORPORATED, OF NEW YORK, N. Y., A CORPORATION OF NEW YORK.

CONTROL APPARATUS.

Application filed April 30, 1927. Serial No. 188,035.

This invention relates to a control apparatus, and more particularly to an apparatus for producing a progressive change of temperature in accordance with a predetermined program.

Many types of annealing furnaces are provided with heating elements of a large capacity with a high rate of temperature increase, as for instance 300° F. per hour, until the maximum temperature is attained. A furnace of this type would not be adapted for heat treating materials such as granular carbon products for the reason that the best results are obtained when the carbon is brought from a temperature of 500° to 2100° in fourteen hours, which is slightly more than 100° per hour.

It is an object of this invention to provide a control apparatus by means of which a predetermined variation of a condition may be obtained.

The invention contemplates the provision of an apparatus for gradually advancing a temperature control mechanism until the desired temperature is attained. In accordance with one embodiment of the invention, a double acting cam mechanism is provided to gradually advance a temperature controller until a predetermined temperature is obtained when the advancing mechanism will be automatically disconnected.

It is believed that a complete understanding of the invention may be had by reference to the following description taken in conjunction with the accompanying drawing, in which Fig. 1 is a perspective view of a temperature recording apparatus in which the invention is incorporated, and Fig. 2 is a diagrammatic view of the circuit connections of the control mechanism.

Referring to the drawing in which similar reference characters designate the same parts in the several views, the invention is illustrated in connection with a well-known type of temperature recording apparatus designated generally at 6 which is adapted to record the temperature of a furnace shown diagrammatically at 7 having a main heating element 3 and an auxiliary heating element 4. The temperature of the furnace is measured in the usual manner by a thermo-couple 8, the electromotive force of which is adapted to be balanced against a potential difference across a portion of a resistance element 17. The potential difference across the resistance element 17 is maintained constant by a potentiometer circuit comprising a battery 9, a fixed resistance 10 and a variable resistance 11 which is provided for the purposee of adjusting for the variation of the electromotive force of the battery 9. When the electromotive force of the thermo-couple 8 is equal to the potential difference across the resistance element 17 between the point 12 and the sliding contact 14, no current will flow in a galvanometer 15 which is included in the thermo-couple circuit. Whenever there is a difference between the electromotive force of the thermo-couple 8 and the potential difference across the resistance element 17 between the point 12 and the sliding contact 14, a current will flow through the galvanometer and deflect a needle 16 either to the right or to the left, depending upon whether the electromotive force is larger or smaller than the potential difference across the portion of the resistance element 17 between the point 12 and the sliding contact 14. The deflection of the galvanometer needle 16 causes a rotation of the shaft 42 to adjust the sliding contact 14 until the balance is again established.

The mechanism for causing the adjustment of the rheostat 17 in accordance with the deflection of the galvanometer needle 16 is illustrated in detail in Fig. 1 in which the needle 16 is shown resting upon a ledge 19 which rises from the center towards either end and terminates in a pair of projections 21 which limit the deflection of the needle. The ledge 19 is fixed to a U-shaped member 22 pivoted at 23 and carrying an arm 24, the lower end of which contacts with a cam 25 mounted on a shaft 26 which is continuously rotated by a motor 27 causing a rising and falling of the U-shaped member 22 and the ledge, imparting a similar movement to the end of the needle which rests thereupon. A resilient arm 28 engages a second cam 29 on the shaft 26 which tends to continuously move the arm toward and away from a disk 31. To the lower end of the arm 28 is pivoted a cross arm 32 which carries a pair of shoes 33 adapted to frictionally engage the disk 31 when the arm 28 is moved toward the disk. The cross arm 32 terminates in a pair of projections 34 located in such a position that a pair of rotating cams 35 will not normally strike them. A plate 36 is fixed to the cross arm 32 and carries a pair of pins 37 which are engaged by arms 38 held in engagement with the pins by means of springs 40. The arms 38 are pivoted at 39 and are provided with projections 41. When the galvanometer needle is deflected it will tend to pass under one of the projections 41 and upon the rising of the member 22 the projection 41 will be raised, moving the arm 38, causing it to displace the plate 36 and pivot the arm 32 about its center. At this time the cam 29 will act to allow the shoes 33 to frictionally engage the disk 31, and as the cam 35 is rotated it will engage the projection 34 to return it to its normal position and carry the disk 31 with it, thereby rotating a shaft 42 to adjust the resistance 17 to such a value as to cause the galvanometer needle to return to its central position indicating that the voltage of the thermo-couple is equal to the potential difference across the portion of the resistance element 17 between the point 12 and the sliding contact 14.

Secured upon the shaft 42 is also a grooved pulley 43 around which passes a cord 44 which passes over suitable pulleys 45 and is secured to a marker pen 46 movable transversely with respect to the recorder paper 47 stored upon a spool 49 and passing over a roller 51 which is rotated through suitable worm gearing by means of the motor 27.

The main heating element 3 of the furnace is connected directly across a line 5 so that whenever an operating switch (not shown) is closed, the heating element 3 will be energized and the temperature of the furnace is then controlled by connecting or disconnecting the auxiliary heating element 4 across the line 5. When the furnace is cold, the position of the shaft 42 will be such that an arcuate contact element 54 carried by an insulating disk 53 mounted on the shaft 42 will be in such a position as to contact with a contact member 55. Whenever the contact element 55 is in engagement with the arcuate contact member 54, the plunger 56 will be moved to its uppermost position through the energization of a coil 57, moving the contact member 58 into engagement with contacts 59 to close the circuit through the auxiliary heating element. When, through the rotation of the shaft 42, the insulating disk has been moved to such a position that the contact member 55 engages the arcuate contact member 52, a coil 60 will be energized, moving the core 56 to its lowermost position causing the contact member 58 to break the circuit between the contacts 59 and moving the contact 61 into engagement with contacts 62 to prepare a circuit through the coil 57 so that this coil may again be energized when the contact 55 comes into engagement with the arcuate contact member 54. It will be seen from the above that as long as the contacting member 55 is in engagement with the arcuate contact member 54, the temperature of the furnace will tend to rise, and when the contact member 55 is in engagement with the arcuate contacting member 52, the temperature of the furnace will tend to fall and consequently the position of the contact member 55 determines the temperature of the furnace within its maximum and minimum limits.

The contact member 55 is supported on a gear 64 which is loosely mounted on the shaft 42 and the position of the contact member may be adjusted by setting a dial 65 mounted on a shaft 66 which also carries a gear wheel 67 meshing with the gear 64.

In the annealing of certain types of granular carbon products, it is desirable to advance the temperature very gradually and at a predetermined rate. In order to accomplish this result, a double pawl ratchet is provided consisting of a bell crank lever 71 pivoted at 72, one arm of which actuates a pawl 73 and the other arm of which actuates a pawl 74, both of which engage the teeth of the gear 64. It will be seen that as the bell crank lever is reciprocated, one of the pawls will operate to move the wheel forward, while the other pawl is moving backward to engage another tooth with the result that the wheel 64 will be continuously advanced. The bell crank lever is reciprocated by means of an arm 75 which is provided with an annular member 76 engaging an eccentrically mounted disk 77. The cam 77 is driven from the shaft 26 through a suitable reducing worm gear set 78 and a set of gears 79 which may be replaced by gears of a different ratio if it is desired to vary the rate of temperature increase.

The temperature to which the furnace is to be raised may be varied as desired by placing a clamp 81 opposite the temperature designated on the dial 65. When the temperature has been advanced and the dial rotated to the selected temperature, the clamp 81 will engage an arm 82 attached to a sleeve 83 loosely mounted upon the shaft 66. The opposite end of the sleeve is provided with a projection 84 to which an arm 85 is pivoted, the opposite end of which is pivoted to a link 86 mounted on a pivot 87. A rod 88 is suspended from the arm 85 and is provided with hooks 91 and 92 which engage pawls 73 and 74, respectively. As the dial 65 proceeds to rotate the clamp 81 will carry the arm 82 in a counter-clockwise direction, causing the projection 84 to raise the arm 85, whereby the hooks 91 and 92 will be caused to disengage the pawls 73 and 74 from the wheel 64 and discontinue the advancement of the wheel 64, thereby fixing the position of the contact member 55 to maintain the temperature of the furnace at a value determined by the position to which the contact member 55 has been moved.

It will thus be seen that the invention provides a simple and effective means for continuously advancing the temperature at a predetermined rate until the desired temperature is attained. However, it will be understood that the embodiment of the invention herein illustrated and described is merely a convenient and useful form of the invention which is capable of many other modifications without departing from the spirit and scope of the invention.

What is claimed is:

1. In a temperature control apparatus, a contact member, the position of which determines the temperature, a toothed wheel carrying said member, and a pawl mechanism engaging the toothed wheel for rotating the wheel to continuously vary the temperature.

2. In a temperature control apparatus, a contact member, the position of which determines the temperature, a toothed wheel carrying said member, a bell crank lever each arm of which carries a pawl engaging the toothed wheel, and means for reciprocating the bell crank lever to gradually advance the toothed wheel.

3. In a temperature control apparatus, a contact member, the position of which determines the temperature, a toothed wheel for carrying said member, a pawl mechanism for rotating said wheel to vary the temperature, and means for interrupting the rotation of the wheel when a predetermined temperature is obtained.

4. In a temperature control apparatus, a contact member, the position of which determines the temperature, a toothed wheel for carrying said member, a pawl engaging the wheel to cause a rotation thereof to vary the temperature, and means for disengaging the pawl when a predetermined temperature is obtained.

5. In a temperature control apparatus, a dial for controlling the temperature, a clamp which may be selectively positioned thereon, means for gradually rotating the dial to vary the temperature, an arm located in the path of the clamp, and means associated with said arm for interrupting the temperature variation when the clamp engages the arm.

6. In a temperature control apparatus, a contact member, the position of which determines a temperature, a toothed wheel for carrying said member, a pawl mechanism for rotating the wheel to vary the temperature, means for disengaging the pawl mechanism from the wheel at a predetermined temperature, a dial for indicating temperatures, and means associated with the dial for actuating the means for disengaging the pawl mechanism at a predetermined temperature.

7. In a temperature control apparatus, a contact member, the position of which determines a temperature, a toothed wheel for carrying said member, a pawl mechanism for rotating the wheel to vary the temperature, an adjustable means for controlling the temperature, means actuated by the toothed wheel for carrying the adjustable means, means lying in the path of the adjustable means adapted to be engaged by the adjustable means, and means associated with the last mentioned means for disengaging the pawl mechanism from the toothed wheel.

8. In a temperature control apparatus, a contact member, the position of which determines a temperature, a toothed wheel for carrying said member, a pawl mechanism for rotating the wheel to vary the temperature, a gear rotated by the toothed wheel, a shaft rotated by the gear, a controlling dial indicating various temperatures and fixed to the shaft, a clamp mounted on the dial and adjustable to the desired indicated temperature, an arm located in the path of the clamp and adapted to be rotated thereby, a shaft supporting the arm and adapted to be rotated thereby, and levers actuated by the last mentioned shaft to move the pawl mechanism out of engagement with the toothed wheel.

In witness whereof, I hereunto subscribe my name this 22nd day of April A. D., 1927.

AUGUST FRED MELCHING.